(12) United States Patent
Sue et al.

(10) Patent No.: US 10,097,291 B2
(45) Date of Patent: Oct. 9, 2018

(54) METHOD AND SYSTEM FOR DISTRIBUTING CONTENT USING DEVICE-SPECIFIC CONTENT DELIVERY NETWORKS

(75) Inventors: Ranny Q. Sue, Laguna Niguel, CA (US); Xavier D. Riley, Los Angeles, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 3499 days.

(21) Appl. No.: 11/782,554

(22) Filed: Jul. 24, 2007

(65) Prior Publication Data
US 2009/0029644 A1    Jan. 29, 2009

(51) Int. Cl.
*H04N 7/18* (2006.01)
*H04H 20/42* (2008.01)
(Continued)

(52) U.S. Cl.
CPC ............ *H04H 20/42* (2013.01); *H04H 20/24* (2013.01); *H04H 20/51* (2013.01); *H04H 60/21* (2013.01);
(Continued)

(58) Field of Classification Search
USPC .......................................... 725/118, 115, 63
See application file for complete search history.

(56) References Cited

U.S. PATENT DOCUMENTS 5,852,721 A    12/1998  Dillon et al.
6,401,243 B1    6/2002  Suzuki
(Continued)

FOREIGN PATENT DOCUMENTS

EP    1202507 A    5/2002
WO    0169868 A    9/2001

OTHER PUBLICATIONS

Non-final Office action dated Dec. 22, 2009 in U.S. Appl. No. 11/782,565, filed Jul. 24, 2007 by Xavier D. Riley et al.
(Continued)

*Primary Examiner* — Jivka Rabovianski
(74) *Attorney, Agent, or Firm* — Harness, Dickey & Pierce, P.L.C.

(57) ABSTRACT

A system 100 includes a first content delivery network 280(1) for a first type of user device, a second content delivery network 280(n) for a second type of user device and a content repository 274 communicating with the first content delivery network 280(1) and the second content delivery network 280(n). The first content is in a first format associated with the first content delivery network 280(1) and a second content associated with the second content delivery network 280(n). A content management system 221 generates a first content list for the first content delivery network 280 and generates a second content list for the second content delivery network 280(n). A content distribution system 260 communicates with the content management system and the first content delivery network and the second content delivery network. The content distribution system 260 transfers content to the first and second content delivery network from the content repository. The first content delivery network 280(1) publishes the content according to a publication start time. The first content delivery network 280(1) communicates the first content list to a first user device. The second content delivery network 280(n) communicates the second content list to a second user device.

18 Claims, 9 Drawing Sheets

(51) Int. Cl.
| | | |
|---|---|---|
| *H04H 20/24* | (2008.01) | |
| *H04H 20/51* | (2008.01) | |
| *H04H 60/21* | (2008.01) | |
| *H04H 60/23* | (2008.01) | |
| *H04H 60/73* | (2008.01) | |
| *H04H 60/91* | (2008.01) | |
| *H04N 7/173* | (2011.01) | |
| *H04N 21/231* | (2011.01) | |
| *H04N 21/236* | (2011.01) | |
| *H04N 21/24* | (2011.01) | |
| *H04N 21/2547* | (2011.01) | |
| *H04N 21/258* | (2011.01) | |
| *H04N 21/262* | (2011.01) | |
| *H04N 21/2665* | (2011.01) | |
| *H04H 40/90* | (2008.01) | |

(52) U.S. Cl.
CPC ............ *H04H 60/23* (2013.01); *H04H 60/73* (2013.01); *H04H 60/91* (2013.01); *H04N 7/17318* (2013.01); *H04N 21/236* (2013.01); *H04N 21/23106* (2013.01); *H04N 21/2407* (2013.01); *H04N 21/2547* (2013.01); *H04N 21/25891* (2013.01); *H04N 21/2665* (2013.01); *H04N 21/26283* (2013.01); *H04H 40/90* (2013.01)

(56) References Cited

U.S. PATENT DOCUMENTS

| | | |
|---|---|---|
| 6,557,171 B1 | 4/2003 | Sonoda et al. |
| 6,772,209 B1* | 8/2004 | Chernock et al. ............ 709/225 |
| 6,774,926 B1* | 8/2004 | Ellis et al. ................ 348/14.01 |
| 7,103,906 B1 | 9/2006 | Katz et al. |
| 7,165,050 B2 | 1/2007 | Marking |
| 7,277,870 B2 | 10/2007 | Mourad et al. |
| 7,778,875 B2 | 8/2010 | Schauser et al. |
| 2001/0004769 A1 | 6/2001 | Simon |
| 2002/0007491 A1 | 1/2002 | Schiller et al. |
| 2002/0023268 A1 | 2/2002 | LaRocca et al. |
| 2002/0052969 A1 | 5/2002 | Fujiwara |
| 2002/0059621 A1* | 5/2002 | Thomas et al. ................ 725/87 |
| 2002/0174439 A1 | 11/2002 | Akiyama et al. |
| 2002/0184642 A1 | 12/2002 | Lude et al. |
| 2003/0009765 A1 | 1/2003 | Linden et al. |
| 2003/0066085 A1 | 4/2003 | Boyer et al. |
| 2003/0093806 A1* | 5/2003 | Dureau et al. ................ 725/107 |
| 2003/0121047 A1 | 6/2003 | Watson et al. |
| 2004/0019900 A1 | 1/2004 | Knightbridge et al. |
| 2004/0117839 A1 | 6/2004 | Watson et al. |
| 2004/0133907 A1 | 7/2004 | Rodriguez et al. |
| 2005/0216952 A1* | 9/2005 | Johnson ........................ 725/147 |
| 2006/0037037 A1 | 2/2006 | Miranz |
| 2006/0143654 A1 | 6/2006 | Mochiduki |
| 2007/0011709 A1* | 1/2007 | Katz et al. ...................... 725/87 |
| 2007/0113246 A1 | 5/2007 | Xiong |
| 2007/0150922 A1 | 6/2007 | Seo et al. |
| 2007/0192805 A1 | 8/2007 | Dutta et al. |
| 2007/0283449 A1 | 12/2007 | Blum et al. |
| 2008/0022347 A1 | 1/2008 | Cohen |
| 2008/0141303 A1* | 6/2008 | Walker et al. .................. 725/39 |
| 2008/0155613 A1 | 6/2008 | Benya et al. |
| 2009/0029644 A1 | 1/2009 | Sue et al. |
| 2009/0031370 A1 | 1/2009 | Riley et al. |

OTHER PUBLICATIONS

Non-final Office action dated Jan. 21, 2010 in U.S. Appl. No. 11/782,579, filed Jul. 24, 2007 by Xavier D. Riley et al.
Final Rejection dated May 4, 2010 in U.S. Appl. No. 11/828,520, filed Jul. 26, 2007 by Xavier D. Riley et al.
Final Rejection dated May 12, 2010 in U.S. Appl. No. 11/828,292, filed Jul. 25, 2007 by Xavier D. Riley et al.
Final Rejection dated Jun. 16, 2010 in U.S. Appl. No. 11/782,565, filed Jul. 24, 2007 by Xavier D. Riley et al.
Non-final Office action dated Oct. 29, 2009 in U.S. Appl. No. 11/828,292, filed Jul. 25, 2007 by Xavier D. Riley et al.
Non-final Office action dated Nov. 18, 2009 in U.S. Appl. No. 11/828,520, filed Jul. 26, 2007 by Xavier D. Riley et al.
Final Rejection dated Jul. 12, 2010 in U.S. Appl. No. 11/782,579, filed Jul. 24, 2007 by Xavier D. Riley et al.
Final Rejection dated Dec. 17, 2012 in U.S. Appl. No. 11/828,520, filed Jul. 26, 2007 by Xavier D. Riley et al.
Notice of Allowance dated Feb. 27, 2015 in U.S. Appl. No. 11/782,565, filed Jul. 24, 2007 by Xavier D. Riley et al.
Notice of Allowance dated Feb. 8, 2013 in U.S. Appl. No. 11/828,534, filed Jul. 26, 2007 by Xavier D. Riley.
Final Rejection dated Mar. 12, 2014 in U.S. Appl. No. 11/828,292, filed Jul. 25, 2007 by Xavier D. Riley et al.
Non-final Office action dated Feb. 16, 2011 in U.S. Appl. No. 11/828,520, filed Jul. 26, 2007 by Xavier D. Riley et al.
Non-final Office action dated Mar. 23, 2015 in U.S. Appl. No. 11/782,579, filed Jul. 24, 2007 by Xavier D. Riley et al.
Non-final Office action dated Apr. 24, 2012 in U.S. Appl. No. 11/828,520, filed Jul. 26, 2007 by Xavier D. Riley et al.
Final Rejection dated Jun. 5, 2012 in U.S. Appl. No. 11/828,534, filed Jul. 26, 2007 by Xavier D. Riley.
Non-final Office action dated Jun. 22, 2011 in U.S. Appl. No. 11/828,534, filed Jul. 26, 2007 by Xavier D. Riley.
Notice of Allowance dated Jun. 26, 2013 in U.S. Appl. No. 11/828,520, filed Jul. 26, 2007 by Xavier D. Riley et al.
Final Rejection dated Aug. 5, 2011 in U.S. Appl. No. 11/828,520, filed Jul. 26, 2007 by Xavier D. Riley et al.
Non-final Office action dated Aug. 29, 2013 in U.S. Appl. No. 11/828,292, filed Jul. 25, 2007 by Xavier D. Riley et al.
Non-final Office action dated Dec. 20, 2011 in U.S. Appl. No. 11/828,534, filed Jul. 26, 2007 by Xavier D. Riley.
Chinese Office action dated Nov. 23, 2012 in Chinese Patent Application No. 200880106028.6 filed Jul. 23, 2008 by Xavier D. Riley et al.
Final Rejection dated Sep. 15, 2015 in U.S. Appl. No. 11/782,579, filed Jul. 24, 2007 by Xavier D. Riley et al.
International Search Report and Written Opinion dated Feb. 12, 2009 in International Application No. PCT/US2008/070909 filed Jul. 23, 2008 by Xavier D. Riley et al.

* cited by examiner

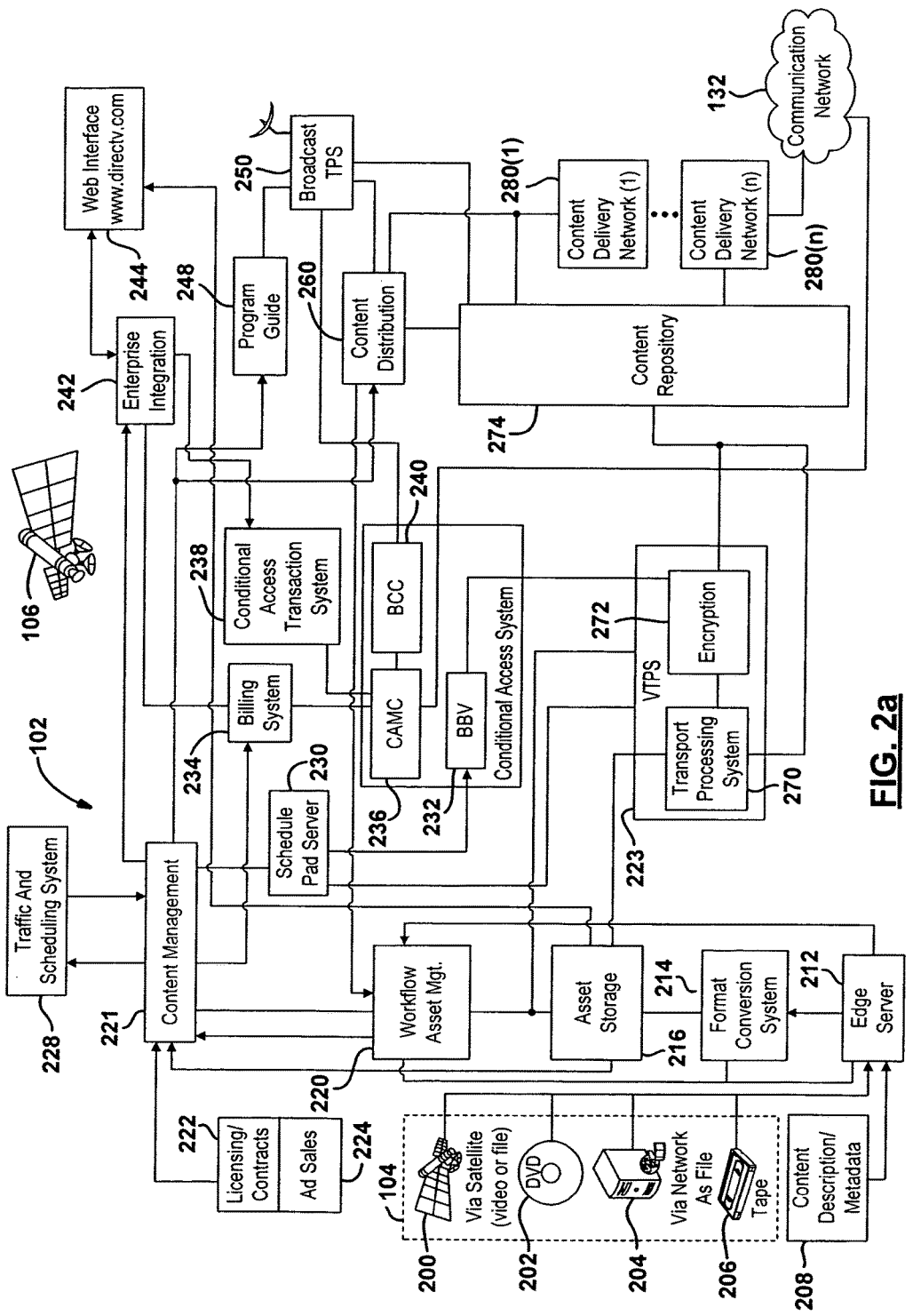

METHOD AND SYSTEM FOR DISTRIBUTING CONTENT USING DEVICE-SPECIFIC CONTENT DELIVERY NETWORKS

TECHNICAL FIELD

The present disclosure relates to a content processing and delivery system and, more specifically, to a system for processing different types of content for different types of user devices using different delivery networks.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as the operating code for the set top box.

Satellite television systems typically broadcast content to a number of users simultaneously in a system. Satellite television systems also offer subscription or pay-per-view access to broadcast content. Access is provided using signals broadcast over the satellite. Once access is provided the user can access the particular content. The broadcasting of a large selection of channels and pay-per-view programs uses a considerable amount of satellite resources.

Content providers are increasingly trying to determine additional ways to provide content to users. Some content may be desired by a small number of customers. In such a case using valuable satellite resources at peak viewing times may not be cost effective. Less popular content may be broadcast by satellite at less popular viewing times, or may be available for downloading on demand via a broadband connection. Such content may be received and stored by a digital video recorder for later viewing.

SUMMARY

The present disclosure provides a system that is capable of supporting many types of devices and various types of processing to accommodate the various types of devices.

In one aspect of the disclosure, a method includes establishing a first content delivery network for a first type of user device and a second content delivery network for a second type of user device, storing first content in a first format associated with the first network and a second content associated with the second network, generating a first content list for the first content delivery network, generating a second content list for the second content delivery network, communicating the first content list to a first user device through the first content delivery network and communicating the second content list to a second user device through the second content delivery network.

In a further aspect of the disclosure, a method includes transferring a first content to a first content delivery network, said content having a first publication start time and a first purge time, transferring a first content to a second content delivery network, said content having a second publication start time and a second purge time, publishing a second content according to a first publication start time, publishing the second content according to a second publication start time, purging the first content from the first content delivery network at the first purge time and purging the second content from the second content delivery network at the first purge time.

In another aspect of the disclosure, a system includes a first content delivery network for a first type of user device, a second content delivery network for a second type of user device and a content repository communicating with the first content delivery network and the second content delivery network. The first content is in a first format associated with the first content delivery network and a second content associated with the second content delivery network. A content management system generates a first content list for the first content delivery network and generates a second content list for the second content delivery network. A content distribution system communicates with the content management system and the first content delivery network and the second content delivery network. The content distribution system transfers content to the first and second content delivery network from the content repository. The content delivery network publishes the content according to a publication start time. The first content delivery network communicates the first content list to a first user device. The second content delivery network communicates the second content list to a second user device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2a is a detailed block diagrammatic view of the content processing system of FIG. 1.

DETAILED DESCRIPTION

Figure 1:
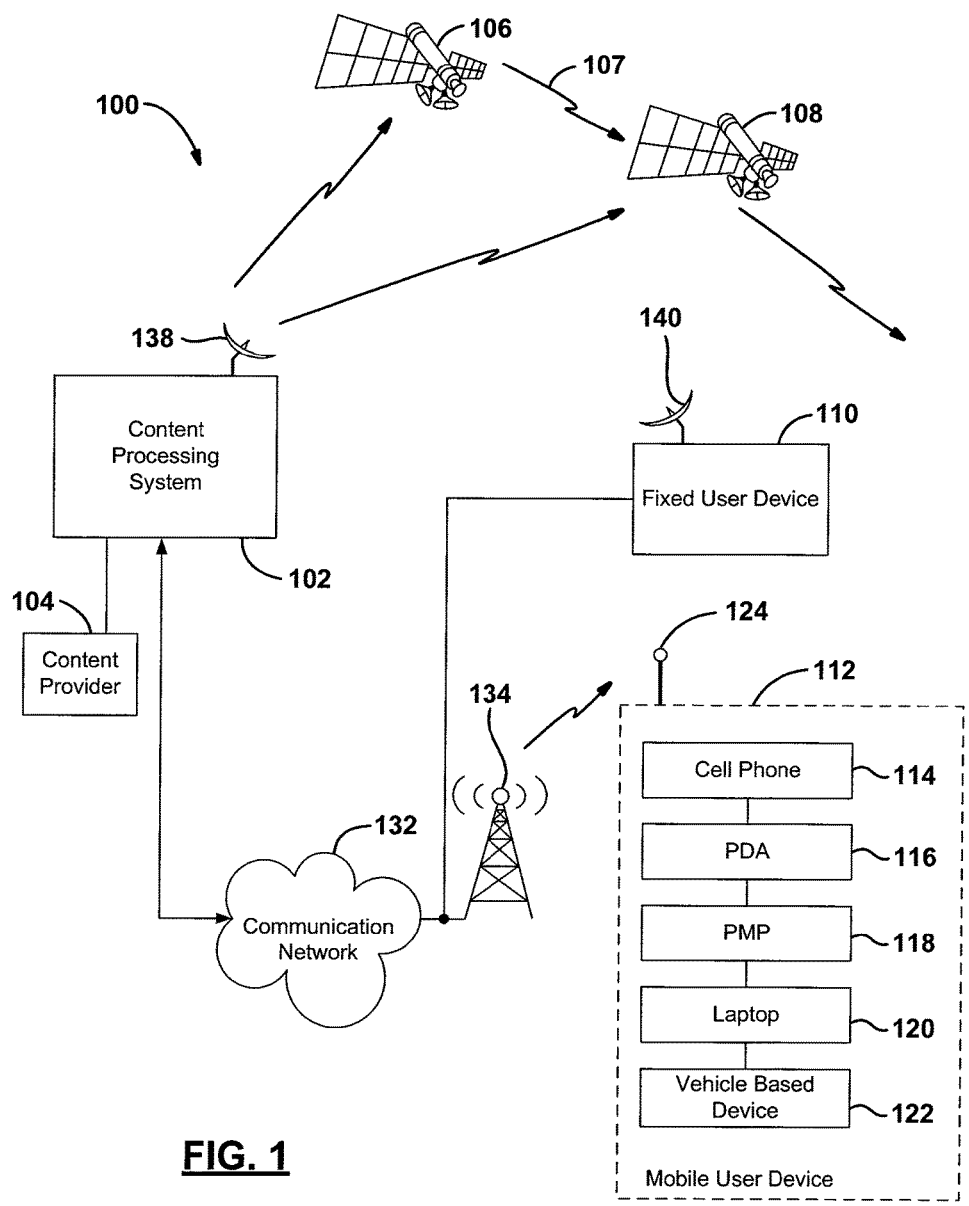
FIG. 1 is a schematic illustration of a communication system according to the disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The following system is described with respect to a satellite system and a broadband system. The broadband distribution system may be implemented in a cable or telephone-type system. An optical fiber may also be used in the broadband system. Wireless distribution may also be used in the broadband distribution system.

While the following disclosure is made with respect to example DIRECTV® broadcast services and systems, it should be understood that many other delivery systems are readily applicable to disclosed systems and methods. Such systems include other wireless distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE), integrated receiver/decoders (IRDs) and a content delivery network (CDN) as described below can be reallocated as desired without departing from the intended scope of the present patent.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

Referring now to FIG. 1, a communication system 100 includes a content processing system 102 that is used as a processing and transmission source, a plurality of content providers, one of which is shown at reference numeral 104 and a first satellite 106. A second satellite 108 may also be incorporated into the system. The satellites 106, 108 may be used to communicate different types of information or different portions of various contents from the content processing system 102. The system 100 also includes a plurality of fixed user devices 110 such as integrated receiver/decoders (IRDs). Wireless communications are exchanged between the content processing system 102 and the fixed user devices 110 through one or more of the satellites 106, 108. The wireless communications may take place at any suitable frequency, such as, for example, Ka band and/or Ku-band frequencies.

A mobile user device 112 may also be incorporated into the system. The mobile user device 112 may include, but is not limited to, a cell phone 114, a personal digital assistant 116, a portable media player 118, a laptop computer 120, or a vehicle-based device 122. It should be noted that several mobile devices 112 and several fixed user devices 110 may be used in the communication system 100. The mobile devices 112 may each have a separate antenna generally represented by antenna 124. The mobile devices may be web-based devices using WiFi, WiMax, cellular broadband or wireless broadband systems.

In addition to communication via the satellites 106, 108, various types of information such as security information, encryption-decryption information, content, or content portions may be communicated terrestrially. Various communication means such as a communication network 132 include, but are not limited to, the public switched telephone network (PSTN), a terrestrial wireless system, a broadband system, stratospheric platform, an optical fiber, or the like may be used to terrestrially communicate with the fixed user device 110 or the mobile user device 112. To illustrate the terrestrial wireless capability an antenna 134 is illustrated for wireless terrestrial communication to the mobile user device 112.

Information or content provided to content processing system 102 from the media source 104 may be transmitted, for example, via an uplink antenna 138 to the satellite(s) 106,108, one or more of which may be a geosynchronous or geo-stationary satellite, that, in turn, rebroadcast the information over broad geographical areas on the earth that include the user devices 110, 112. The satellites may have inter-satellite links 107 that allow the satellites to communicate signals therebetween. Among other things, the example content processing system 102 of FIG. 1 provides program material or content to the user devices 110, 112 and coordinates with the user devices 110, 112 to offer subscribers pay-per-view (PPV) program services and broadband services, including billing and associated decryption of video programs. Non-PPV (e.g. free or subscription) programming may also be received. To receive the information rebroadcast by satellites 106, 108, each for user device 110 is communicatively coupled to a receiver or downlink antenna 140.

Lists of available content may also be communicated by way of the communication network 132 or the satellites 106, 108. The lists may also be made available at a web server. The lists and content may be communicated separately through different means or through the same means.

Security of assets broadcast via the satellites 106, 108 may be established by applying encryption and decryption to assets or content during content processing and/or during broadcast (i.e., broadcast encryption). For example, an asset can be encrypted based upon a control word (CW) known to the content processing system 102 and known to the user devices 110, 112 authorized to view and/or playback the asset. In the illustrated example communication system 100, for each asset the content processing system 102 generates a control word packet (CWP) that includes, among other things, a time stamp, authorization requirements and an input value and then determines the control word (CW) for the asset by computing a cryptographic hash of the contents of the CWP. The CWP is also broadcast to the user devices 110, 112 via the satellites 106, 108. The user devices authorized to view and/or playback the broadcast encrypted asset will be able to correctly determine the CW by computing a cryptographic hash of the contents of the received CWP. If the user device 110 is not authorized, the IRD 110 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption.

Referring now to FIG. 2a, the content processing system 102 of FIG. 1 is illustrated in further detail. The content provider 104 may include various types of content providers, including those that provide content by way of a satellite 200, DVD 202, via a network as a file in 204, by way of tapes and other means. The content provider 104 may also provide a content description and other metadata 208 to the system. An input server 212 may receive the various content and associated metadata and convert the format in a format conversion system 214. A house format asset storage server 216 may be used to store the content asset in a house format. Still image files, trailers, and other information may also be stored in the house format asset storage server. A workflow management system 220 is used to control the format conversion system 214 and the server 212. Also, the workflow management system 220 is coupled to the house format asset storage server 216 and performs ingest control. The house format asset storage server 216 provides still images to a content management system 221 and house format file, video and audio files to the video transport processing system 223.

The VTPS 223 may encode the packets containing the content. The encoder may encode the data into various transport formats such as DIRECTV® proprietary formats, or industry standard formats. The encoded data is then packetized into a stream of data packets by a packetizer 270 that also attaches a header to each data packet to facilitate identification of the contents of the data packet such as, for example, a sequence number that identifies each data packet's location within the stream of data packets (i.e., a bitstream). The header also includes a program identifier (PID) (e.g., a service channel identifier (SCID)) that identifies the program to which the data packet belongs.

The stream of data packets (i.e., a bitstream) is then broadcast encrypted by, for example, the well-known Advanced Encryption Standard (AES) or the well-known Data Encryption Standard (DES). In an example, only the payload portion of the data packets are encrypted thereby allowing a user device 110 to filter, route and/or sort received broadcast encrypted data packets without having to first decrypt the encrypted data packets.

The content management system 221 generally controls the overall movement and distribution of contents through the content processing system 102.

A licensing and contract information 222 and ads from ad sales 224 may be provided to the content management system 221. That is, licensing information, tier assignments, pricing and availability may be provided to the content management system. Asset information, file names and durations may be exchanged between the content management system 221 and the workflow management system 220. The asset information, such as file names and durations, may be determined at the server 212 that is coupled to the workflow management system 220.

The Content Management System (CMS) 221 in combination with the SPS (230) is used to provide the requested channel, program associated data (PAD), channel information and program information packets (PIPs). The CMS 221 may schedule content processing for a plurality of received assets based on a desired program lineup to be offered by the communication system 100. For example, a live TV program for which a high demand for reruns might be expected could be assigned a high priority for content processing.

A schedule PAD server (SPS) 230 may be coupled to the CMS and is used to generate a broadband video PAD that is communicated to a conditional access system for broadband video 232. The conditional access system for broadband video 232 may be used to generate control words and control word packet in pairs and provide those to the video transport processing system 223.

In the illustrated example of FIG. 2a, users of the user devices 110 (of FIG. 1) are charged for subscription services and/or asset downloads (e.g., PPV TV) and, thus, the content processing system 102 includes a billing system 234 to track and/or bill subscribers for services provided by the system 100. For example, the billing system 234 records that a user has been authorized to download a movie and once the movie has been successfully downloaded the user is billed for the movie. Alternatively, the user may not be billed unless the movie has been viewed.

A billing system 234 receives pricing and availability information from the content management system 221. A conditional access system 236 receives callback information from the communication network 132. The conditional access system may be used to generate authorizations, pay-per-view billing data, and callback data from the billing system 234. Remote record requests may also be provided from the conditional access transaction system 238. A conditional access system BCC 240 may be used to generate a conditional access packet from the information from the conditional access system 236.

The billing system 234 may generate purchase data that is provided to the enterprise integration (EI) block 242. The enterprise integration block 242 may generate remote record requests to the conditional access transaction system 238. Remote record requests may be generated through a web interface such as DIRECTV.com® in block 244. Various ordering information, such as ordering broadband video, pay-per-view, and various services may be received at the web interface 244. Various trailers may also be accessed by the users through the web interface 244 provided from the house format asset storage server 216. Enterprise integration block 242 may also receive guide information and metadata from the content management system 221.

Titles, description and various categories from the content management system 221 may be provided to the advanced program guide system 248. The program guide system 248 may be coupled to a satellite broadcasting system such as a broadcast transport processing system 250 that broadcasts content to the users through the satellite 106, 108.

The program guide data generated by the program guide system 248 may include information that is used to generate a display of guide information to the user, wherein the program guide may be a grid guide and informs the user of particular programs that are broadcast on, particular channels at particular times. The program guide may be a list of content available through a communication means. A program guide may also include information that a user device uses to assemble programming for display to a user. For example, the program guide may be used to tune to a channel on which a particular program is offered. The program guide may also contain information for tuning, demodulating, demultiplexing, decrypting, depacketizing, or decoding selected programs.

Content files may also be provided from the content management system 221 to the content distribution system 260.

Referring back to the video transport processing system 223, the video transport processing system 223 includes a transport packaging system 270. The transport processing system 270 creates pre-packetized unencrypted files. An encryption module 272 receives the output of the transport processing system and encrypts the packets. Fully packaged and encrypted files may also be stored in the content repository 274. Encryption may take place in the data portion of a packet and not the header portion.

One or more content delivery networks 280 may be used to provide content files such as encrypted or unencrypted and packetized files to the communication network 132 for distribution to the user devices 110, 112. The content distribution system 260 may make requests for delivery of the various content files and assets through the communication network 132. The content distribution system 260 also generates satellite requests and broadcasts various content and assets through the broadcast transport processing system 250. Some content delivery networks may be dedicated to a certain type of service or communication means. As will be described in FIG. 2b, one content delivery network may be dedicated to web service. Others may be dedicated to mobile phone service. Still others may be dedicated to other types of communication.

The communication network 132 may be a web-based system such as the Internet 122 which is a multiple-point-to-multiple-point communication network. However, persons of ordinary skill in the art will appreciate that point-to-point communications may also be provided through the communication network 132. For example, downloads of a particular content file from a content delivery network may be communicated to a particular user device. Such file transfers and/or file transfer protocols are widely recognized as point-to-point communications or point-to-point communication signals and/or create point-to-point communication paths, even if transported via a multi-point-to-multi-point communication network such as the Internet. It will be further recognized that the communication network 132 may be used to implement any variety of broadcast system where a broadcast transmitter may transmit any variety of data or data packets to any number of or a variety of clients or receivers simultaneously. Moreover, the communication network 132 may be used to simultaneously provide broadcast and point-to-point communications and/or point-to-point communication signals from a number of broadcast transmitters or content delivery networks 280.

The content delivery network 280 may be implemented using a variety of techniques or devices. For instance, a plurality of Linux-based servers with fiber optic connections may be used. Each of the content delivery networks 280 may include servers that are connected to the Internet or the communication network 132. This allows the user devices to download information or content (example, a movie) from the content delivery network 280. The content delivery network 280 may act as a cache for the information provided from the content repository 274. A particular user device may be directed to a particular content delivery network 280 depending on the specific content to be retrieved. An Internet uniform resource locator (URL) may be assigned to a movie or other content. Further, should one of the delivery networks 280 have heavy traffic, the content delivery network may be changed to provide faster service. In the interest of clarity and ease of understanding, throughout this disclosure reference will be made to delivering, downloading, transferring and/or receiving information, video, data, etc. by way of the content delivery network 280. However, persons of ordinary skill in the art will readily appreciate that information is actually delivered, downloaded, transferred, or received by one of the Internet-based servers in or associated with the content delivery network 280.

It should be appreciated that the content delivery network 280 may be operated by an external vendor. That is, the operator of the content delivery network 280 may not be the same as the operator of the remaining portions of the content processing system 102. To download files from the content delivery network 280, user devices 110, 112 may implement an Internet protocol stack with a defined application layer and possibly a download application provided by a content delivery network provider. In the illustrated example, file transfers are implemented using standard Internet protocols (file transfer protocol FTP), hyper text transfer protocol (HTTP), etc. Each file received by the user device may be checked for completeness and integrity and if a file is not intact, missing, and/or damaged portions of the files may be delivered or downloaded again. Alternatively, the entire file may be purged from the IRD and delivered or downloaded again.

The broadcast transport processing system 250 may provide various functions, including packetizing, multiplexing and modulating, and uplink frequency conversion. RF amplification may also be provided in the broadcast transport processing system 250.

Wireless delivery via the satellites 106, 108 may simultaneously include both files (e.g., movies, pre-recorded TV shows, games, software updates, asset files, etc.) and/or live content, data, programs and/or information. Wireless delivery via the satellites 106, 108 offers the opportunity to deliver, for example, a number of titles (e.g., movies, pre-recorded TV shows, etc.) to virtually any number of customers with a single broadcast. However, because of the limited channel capacity of the satellites 106, 108, the number of titles (i.e., assets) that can be provided during a particular time period is restricted.

In contrast, Internet-based delivery via the CDN 280 can support a large number of titles, each of which may have a narrower target audience. Further, Internet-based delivery is point-to-point (e.g., from an Internet-based content server to a user device 110, 112) thereby allowing each user of the user device 110, 112 to individually select titles. Allocation of a title to satellite and/or Internet-based delivery or content depends upon a target audience size and may be adjusted over time. For instance, a title having high demand (i.e., large initial audience) may initially be broadcast via the satellites 106, 108, then, over time, the title may be made available for download via the CDN 280 when the size of the target audience or the demand for the title is smaller. A title may simultaneously be broadcast via the satellites 106, 108 and be made available for download from the CDN 280 via the communication network 132.

In the example communication system 100, each asset (e.g., program, title, content, game, TV program, etc.) is pre-packetized and, optionally, pre-encrypted and then stored as a data file (i.e., an asset file). Subsequently, the asset file may be broadcast via the satellites 106, 108 and/or sent to the CDN 280 for download via the CDN 280 (i.e., Internet-based delivery). In particular, if the data file is broadcast via the satellites 106, 108, the data file forms at least one payload of a resultant satellite signal. Likewise, if the data file is available for download via the CDN 280, the data file forms at least one payload of a resultant Internet signal.

It will be readily apparent to persons of ordinary skill in the art that even though at least one payload of a resultant signal includes the data file regardless of broadcast technique (e.g., satellite or Internet), how the file is physically transmitted may differ. In particular, transmission of data via a transmission medium (e.g., satellite, Internet, etc.) comprises operations that are: (a) transmission medium independent and b) transmission medium dependent. For example, transmission protocols (e.g., transmission control protocol/Internet protocol (TCP/IP), user datagram protocol (UDP), encapsulation, etc.) and/or modulation techniques (e.g., quadrature amplitude modulation (QAM), forward error correction (FEC), etc.) used to transmit a file via Internet signals (e.g., over the Internet 122) may differ from those used via satellite (e.g., the satellites 106, 108). In other words, transmission protocols and/or modulation techniques are specific to physical communication paths, that is, they are dependent upon the physical media and/or transmission medium used to communicate the data. However, the content (e.g., a file representing a title) transported by any given transmission protocol and/or modulation is agnostic of the transmission protocol and/or modulation, that is, the content is transmission medium independent.

The same pre-packetized and, optionally, pre-encrypted, content data file that is broadcast via satellite may be available for download via Internet, and how the asset is stored, decoded and/or played back by the user devices 110 is independent of whether the program was received by the user devices 110 via satellite or Internet. Further, because the example content processing system 102 of FIG. 1 broadcasts a live program and a non-live program (e.g., a movie) by applying the same encoding, packetization, encryption, etc., how a program (live or non-live) is stored, decoded and/or played back by the user devices 110 is also independent of whether the program is live or not. Thus, user devices 110, 112 may handle the processing of content, programs and/or titles independent of the source(s) and/or type(s) of the content, programs and/or titles. In particular, example delivery configurations and signal processing for the example content delivery system of FIG. 2*a* are discussed in detail below.

Figure 2B:
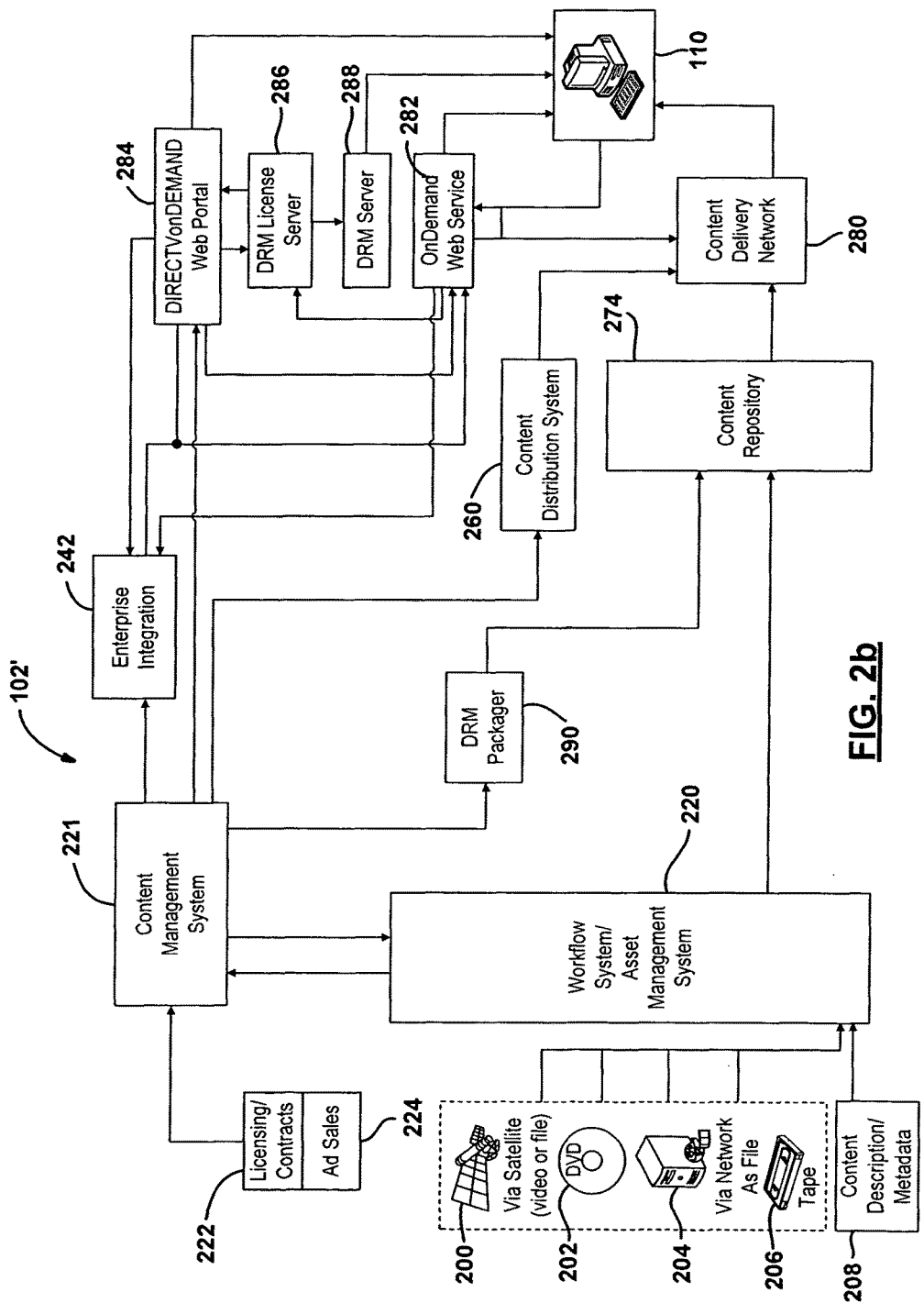
FIG. 2b is a detailed block diagrammatic view of an alternative the content processing system of FIG. 1 for web based devices.

Referring now to FIG. 2*b*, an alternative content processing system 102' suitable for web-based systems is illustrated. The system in FIG. 2*b* may also be used together with that of FIG. 2*a* so that different methods for distribution can take place. The content processing system 102' shares many components with those of the content processing system 102. Therefore, the detail associated with these elements will not be described again. The same reference numerals are used to describe the same elements. This embodiment is different from the embodiment illustrated in FIG. 2*a* in that the content processing system 102' is used for web-based devices. Various devices may be web-based devices and include those illustrated in FIG. 1 as reference numerals 114-122. The web-based devices may be WiMax, WiFi, or otherwise wireless broadband-capable. Various types of content are provided by the content provider 104, are provided to the workflow system 220 in a similar manner to that illustrated in FIG. 2. In this embodiment, various license information, tier assignments and pricing availability are provided to the content management system 221 from the licensing/contracts 222 and ad sales 224. Various types of information that are entered into the content management system 221 may be referred to as business rules. The various business rules may be added manually or may be added automatically based upon various contracts with various contract dividers. The business rules may also include the pricing, the availability, and the type of target such as a set top box, a mobile device or a web device. Also, the availability, such as timing of the content, may be provided. The content management system 221 provides encoding commands such as the various types of targets, material identifications, and the like. The workflow management system 220 provides the content management system 221 collects various asset metadata including the file name, duration of the file, and the like.

The content management system 221 links the business rules with the content.

The content management system 221 provides the enterprise integration module 242 with billing data such as various pay-per-view numbers, publishing dates, and prices. This information may be provided to an on-demand web services 282.

The content management system 221 may also provide a content list or inventory to a web portal 284. Account information may be provided to the web portal 284 from the enterprise integration module 242. Inventory metadata may be provided from the web portal to the on-demand web service 282. A digital rights management (DRM) license server 286 may be used to provide content license information to the web portal 284. The web portal 284 may be used to provide inventory metadata to the DRM license server 286.

A digital rights management server 288 may receive content licenses from the digital rights management license server 286. The content management system 221 may provide digital rights management parameters to a digital rights management packager 290. The digital rights management packager 290 may provide an encrypted content file to the content repository 274 for storage therein. The content repository 274 may also receive encoded content files and posters from the workflow management system 220. The file posters and other information may be associated with the various content files when stored within the content repository 274. It should be noted that the content files may be encrypted or non-encrypted and may also have the digital rights associated therewith. One suitable example for providing digital rights is using a Windows Media® management-type system.

The content management system 221 provides a distribute command to the content distribution system 260. The file location, publication dates, expiration dates, purge dates, and the like may be provided to the content distribution system. The content distribution system communicates upload commands to the content delivery network 280. In this embodiment, the content delivery network 280 may be a web-based network. As will be evident to those skilled in the art, various types of content delivery networks may be used for various types of content. In one aspect of the disclosure, one content delivery network may be provided for each different type of user device. For example, for distributing video to a cellular phone, a cellular phone content delivery network may be used. For a set top box, a set top box content delivery network may be used. Different rights and different encoding schemes may be used for the corresponding different user devices.

The content delivery network 280 provides content to the user devices 110 or 112. The user devices may generate download commands by communicating with the web service 282. The web service 282 may communicate inventory metadata account information that is requested. For example, a content list of available content may be provided to the user devices 110/112.

The digital rights management server 288 may provide licenses that are requested by the system. The web portal 284 may grant pre-delivery licenses to the user device 110/112. Download commands from the web service 282 may be provided to the content delivery network 280 to initiate download of content from the content delivery network 280.

The web-based device may obtain the content list from the web portal 284 so that content available for downloading to the user device may be provided to the user device. Upon selection from the list, a particular piece of content may be provided to the user device. The enterprise integration module 242 generates a bill in response to the downloading of content from the system. The billing information is coordinated with the information from the content user so that the proper user is billed.

Figure 3:
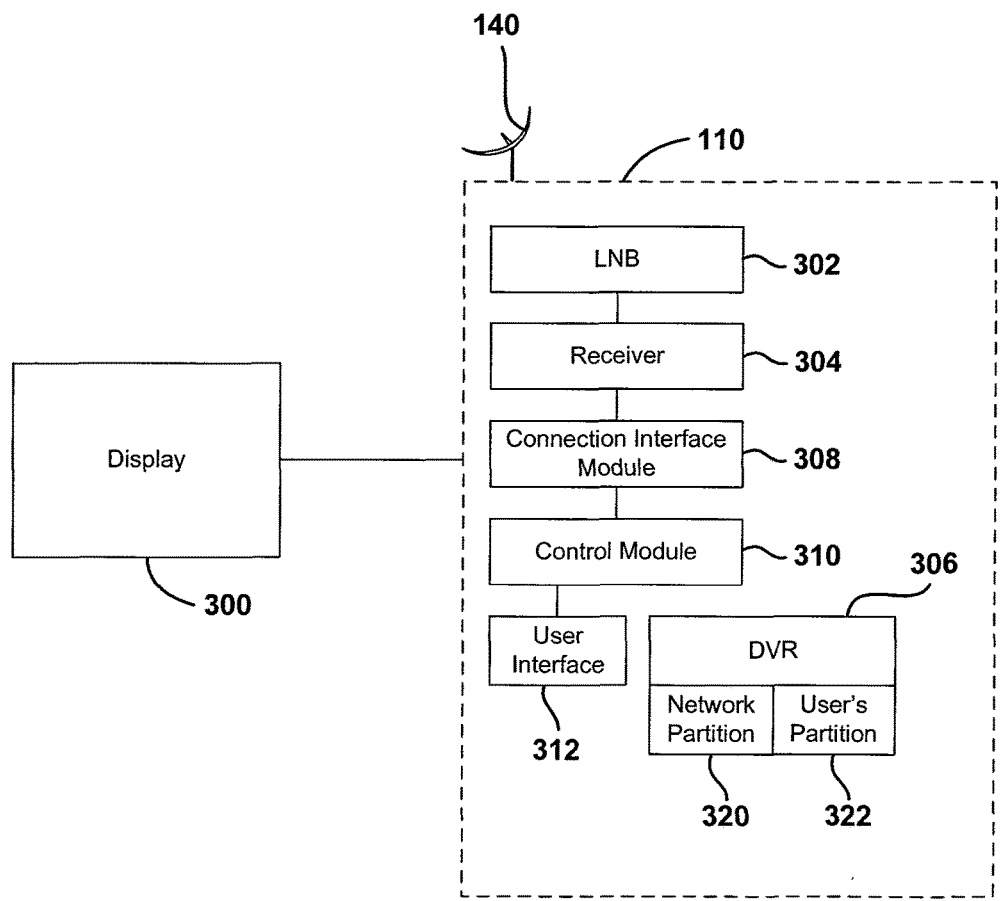
FIG. 3 is a detailed block diagrammatic view of the fixed user device of FIG. 1.

Referring now to FIG. 3, the user device 110 may be one of any variety of devices, for example, a set-top box, a home media server, a home media center (HMC), a personal computer (PC) having a receiver card installed therein, etc. A display device 300 such as a television set, a computer monitor, a portable media player or the like may be coupled to the user device 110. The user device 110 may be an integrated receiver decoder, a satellite television receiver or the like for displaying and/or playback of received programming.

The receive antenna 140 (124 on a mobile device) receives signals conveying a modulated multiplexed bitstream from the satellites 106, 108. Within the receive antenna 140, the signals are coupled from a reflector and feed to a low-noise block (LNB) 302, which amplifies and frequency downconverts the received signals. The LNB 302 output is then provided to a receiver 304, which receives, demodulates, depacketizes, demultiplexes, decrypts and decodes the received signal to provide audio and video signals to the display device 300 or a recorder 306, or both. The memory device 306 may be implemented separately from or within the user device 110. The receiver 304 is responsive to user inputs to, for example, tune to a particular program.

To store received and/or recorded programs and/or assets, the memory device 306 may include any of a variety of storage devices such as a hard disk drive, DVR, or other types of memory devices. The memory device 306 may be used to store the packetized assets and/or programs received via the satellites 106, 108 and/or the CDN 280. In particular, the packets stored on memory device 306 may be the same encoded and, optionally, encrypted packets created by the content processing system 102 and transmitted via the satellites 106, 108 and/or made available for download via the CDN 280.

The memory device 306 may also be a device capable of recording information on, for instance, analog media such as videotape or computer readable digital media such as a hard disk drive (HDD), a digital versatile disc (DVD), a compact disc (CD) and/or any other suitable media.

To communicate with any of a variety of clients, media players, etc., the illustrated example the user device 110 includes one or more connection interface modules 308 (e.g., USB, serial port, Firewire, etc.). The connection interface module 306 may act as a network interface that implements, for example, an Ethernet interface. Should a device be strictly web-based, the LNB 140 and antenna 140 may not be used.

Each user device 110 may connect to the communication network such as the Internet 122 via any of a variety of technologies, for instance, a voice-band and/or integrated services digital network (ISDN) modem connected to a conventional PSTN, a wireless broadband connection (e.g., IEEE 802.11b, 802.11g, etc.), a broadband wired connection (e.g., ADSL, cable modems, etc.), a wired Ethernet connection (e.g., local area network (LAN), wide area network (WAN), etc.), a leased transmission facility (e.g., a digital signal level 1 circuit (a.k.a. a DS1), a fractional-DS1, etc.), etc.

The user device 110 may also include a control module 310 that is used to control the operation of the various components within the user device.

A user interface 312 may, for example, be a set of push buttons or a remote control interface. The user interface 312 is used to make selections, input various data, and change the parameters of the user device 110. The user interface 312 may be used together with a graphical user interface displayed on the display device associated with the user device.

It should also be noted that the user devices 110/112 may be configured in a similar manner to those illustrated in FIG. 3 through reference number 110. Such devices may include an internal antenna rather than an external dish-type antenna that is illustrated in the fixed device as 140. Also, external antennas are possible such as a phased array antenna.

The recording device 306 may also be partitioned into a network partition 320 and a user partition 322. Different types of content or assets may be stored in the network partition 320 or the user partition 322. The content stored in the different partitions may relate to the tier of the content. This will be further described below.

Figure 4A:
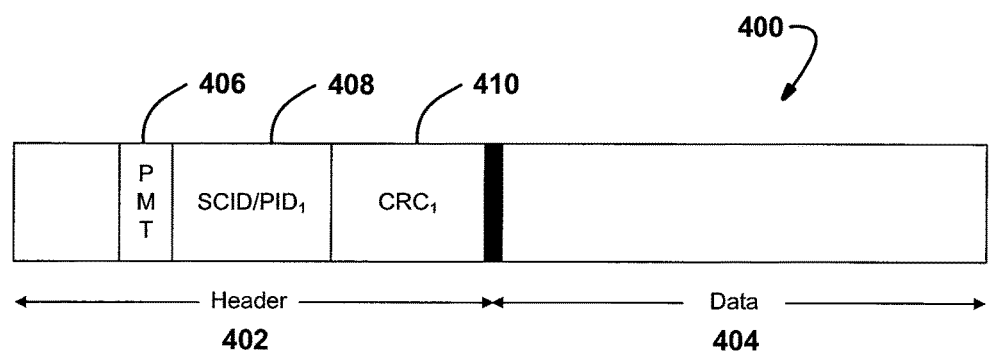
FIGS. 4a and 4b are representational views of packets formed according to the present disclosure.
Figure 4B:
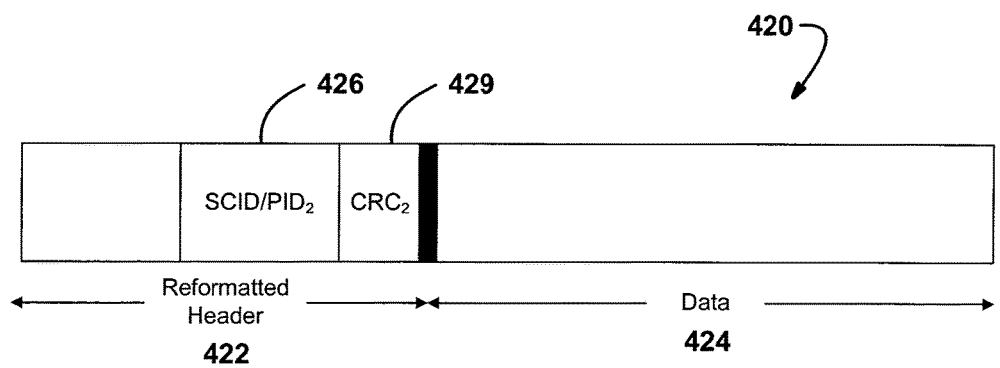

Referring now to FIGS. 4a and 4b, a packet 400 having a header 402 and a data portion 404 is illustrated. The header 402 may include a program map table (PMT) 406, an SCID/PID portion 408, and a cyclic redundancy check portion 410. This is representative of the output of the VTPS and the file stored in the content repository. The data portion 404 may be encrypted or not encrypted, while the header portion 402 is preferably not encrypted. A signal may be broadcast from the content distribution network with this type of format.

In FIG. 4b, a second packet 420 having a reformatted header 422 and a data portion 424 is illustrated. The data portion 424 may be unchanged from data portion 404. The reformatted header 422 includes a second SCID/PID 426 that has been changed. The header 426 of the packet 420 has its identification (SCID/PID) reconfigured so that it may be broadcast by the satellite. Because the SCID/PID is changed, the CRC portion 428 is also changed to conform to this change.

Figure 5:
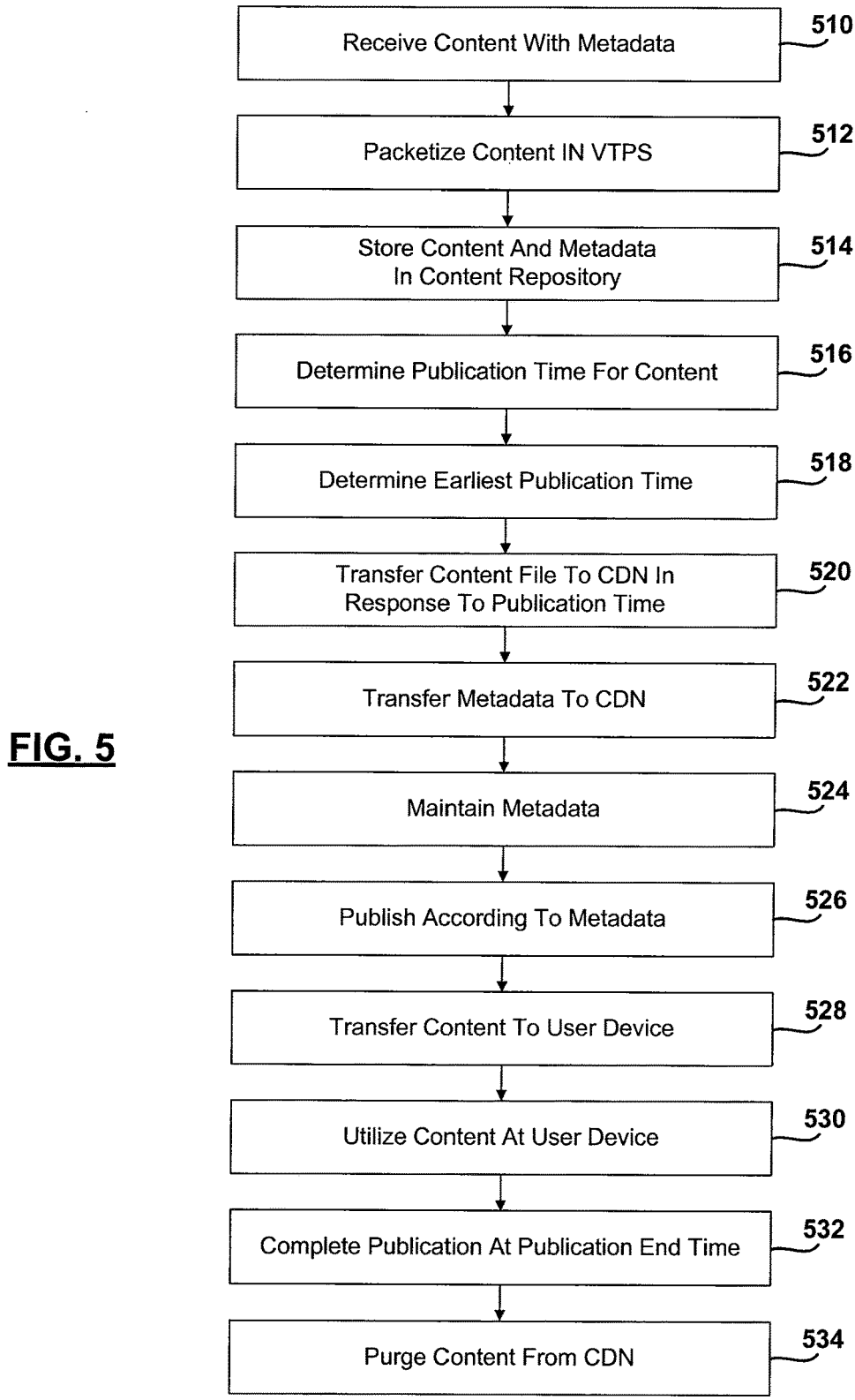
FIG. 5 is a flowchart illustrating a method for publishing and purging content.

Referring now to FIG. 5, a method of operating the communication system is set forth. In this embodiment, the general method for maintaining the files within the system is set forth. Each content delivery network may have different lifecycle parameters associated therewith. Each content delivery network may act according to the method of FIG. 5 using different lifecycle parameters including publication, purge, end times, and the like. In step 510, content with metadata is received in the communication system. As mentioned above, the content provider 104 may provide the content in various forms. In step 512, the content is packetized in the VTPS 223. Also, as mentioned above, the VTPS may also encrypt the packets or at least the data portions of the packets. In step 514, the packets, whether encrypted or not, are stored in the content repository 274. In step 516, a time for publication is determined. The publication time corresponds to the time that the content is available for download by one of the user devices from the content delivery network 280. Various content within the content repository may have different publication times. In step 518, the earliest publication time for the various content is determined. In step 520, the content file is transferred to the content delivery network 280 in response to the publication time. That is, the earliest publication time may be used to transfer content to the content delivery network first. The content may be transferred prior to the publication time so that it is available at the publication time. This is in contrast to a typical satellite broadcasting system and to the broadcast TPS system 250 described in FIG. 2. In a satellite system, the content is broadcast at the air time.

In step 522, metadata corresponding to the content file is transferred to the content delivery network 280. In step 524, the metadata may be changed according to information from the content management system. For example, the publication time, the publication end time, and a purge time may be added to the metadata. In step 526, the content file is published according to the publication time in the metadata. In step 528, the content may be transferred to the user device. In step 530, the user device may utilize the content by viewing the content on the display device. In step 532, publication is complete at the publication end time. In step 534, the content is purged from the content delivery network according to a purge message.

Figure 6:
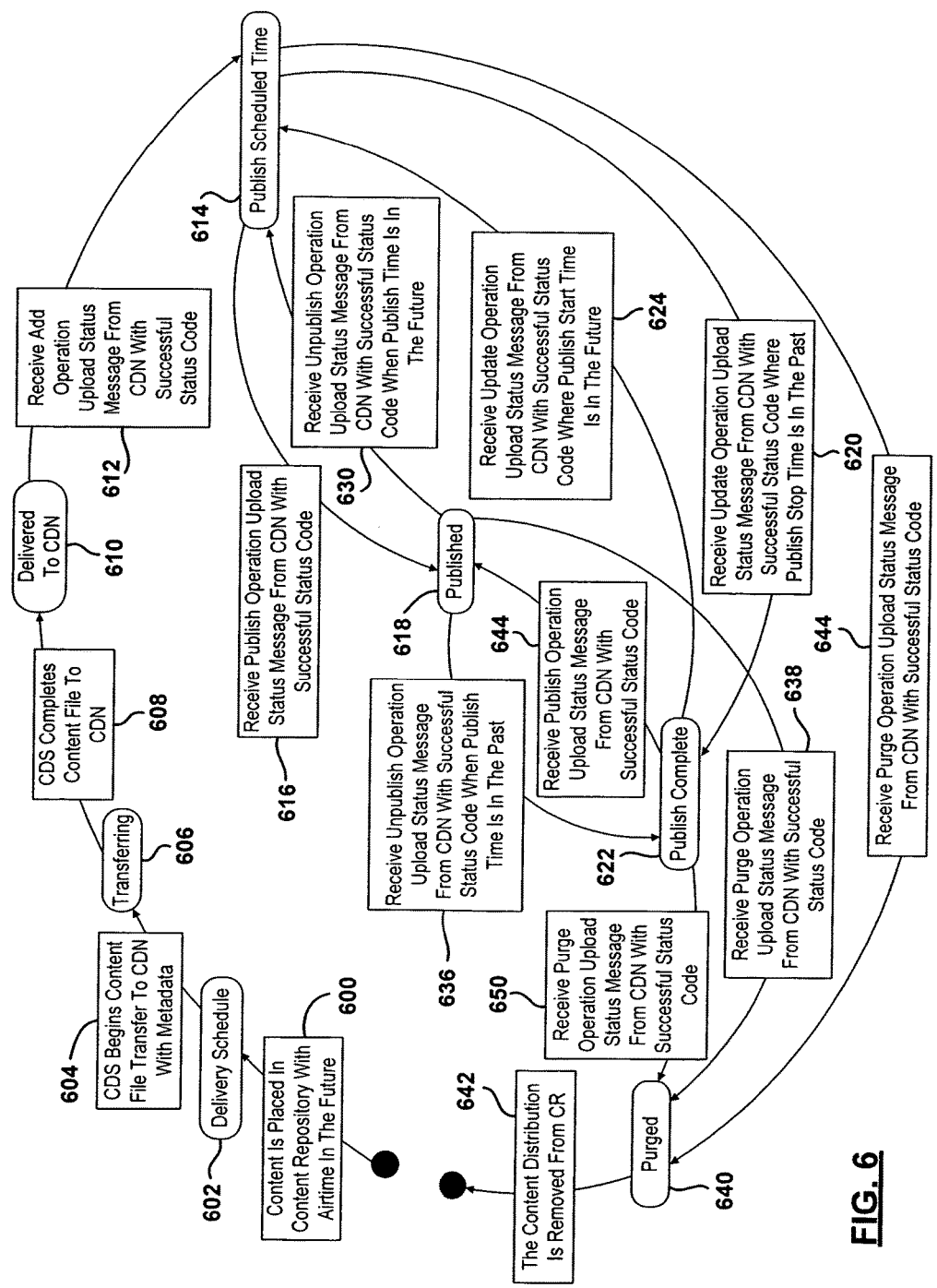
FIG. 6 is a state diagram for publishing and purging content.

Referring now to FIG. 6, a state diagram of the method of FIG. 5 is illustrated. The method begins in step 600 in which the content is placed in the content repository 274 after possible encryption and packetizing from the VTPS 223. In step 602, delivery is scheduled by the content management system 221. The content distribution system 260 begins content file transfer to a content delivery network 280 with metadata in step 604. In step 606, the content with the metadata is transferred. In step 608, the content delivery system completes the content file transfer to the content delivery network 280. In step 610, the content is fully delivered to the content distribution or delivery network 280. In step 612, an add operation is received by the content delivery network. An upload status message from the content delivery network (CDN) with a successful status code is provided.

In step 614, publication is scheduled by setting a publication time. After step 614, step 616 may be performed. In step 616, the content delivery network 280 may receive a publish operation. Also in step 616, an upload status message from the content delivery network may be provided to the content distribution system with a successful status code. In step 618, the content is published.

Referring back to step 614, if an update operation message is received and the upload status message from the content delivery network with a successful status code with the published stop time is in the past at 620, step 622 may be performed. Step 622 ends the publication according to the publication stop time.

Referring back to step 614, if a receive update operation is received and an upload status message from the content delivery network has a successful status code where the publish start time is in the future in step 624, step 622 completes the publication.

Referring back to step 618, when the content is published in 618 and an unpublished operation is received with an upload status message from the content delivery network with a successful status code and a published time in the future, step 630 is performed which brings the system back to the published scheduled block 614.

Referring back to step 618, if an unpublished operation message is received in step 636, and the upload status message from the content delivery network with a successful status code has a publication time in the past, step 622 is performed which completes the publication. In step 618, if a purge operation message is received from the content distribution system and the upload status message from the content distribution network with a successful status code is provided in step 638, the content is purged in step 640.

Referring back to step 622, if the publication is complete and a published operation is received with an upload status message from the content delivery network with a successful status code in step 644, the content is again published in step 618.

Referring back to step 622, if the publication is complete and a purge operation upload status message is received from the content delivery network with a successful status code in step 650, step 640 purges the content from the system. In step 642, the content may be removed from the content repository.

Referring back to the publication schedule times block 614, if a receive purge operation is received that blocks and an upload status message from the content delivery network has a successful status code, step 640 is performed in which the content is purged.

Figure 7:
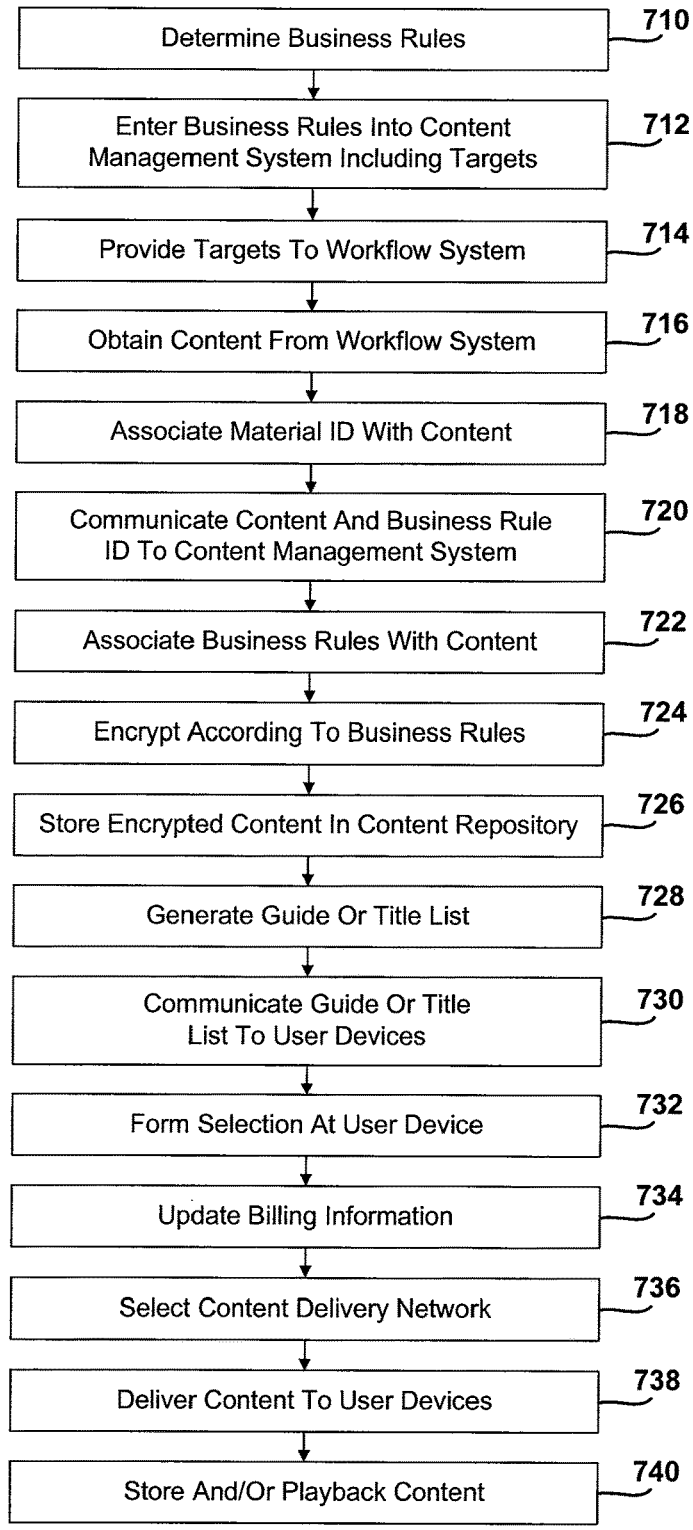
FIG. 7 is a flowchart illustrating a first method for operating the present disclosure.

Referring now to FIG. 7, another method for operating the present disclosure is illustrated. In this example, business rules and content are combined to provide a user selection list and ultimately deliver content to the users. In step 710, business rules are determined. The business rules may be determined and entered into the content management system 221 of FIG. 2a or 2b. The business rules may include various characteristics including the dollar amount, the various targets, such as which user devices are to receive the content, and various other profiles. In step 712, the business rules are entered into the content management system and include the targets. The business rules may be entered by an operator in response to various distribution agreements. In step 714, the targets are provided to the workflow system. In step 716, content that is obtained by the workflow system is provided to the content management system 221. The workflow system provides the content with material IDs that are used for further identification once it is received by the content management system. Each content has a material ID associated therewith. In step 718, the material ID is associated with the content.

In step 720, the content and business rule ID is provided to the content management system. In step 722, the business rules are associated with the content in the content management system. In step 724, the content is encrypted according to the business rules. Encryption may take place at the digital rights management packager in FIG. 2b or the encryption module 272 illustrated in FIG. 2a. Encryption may take place according to the business rules. More specifically, the content may be encrypted depending on the end user device or target for which the content is destined. Various types of encryption may be provided to various contents for use in the various systems. That is, when stored in the content repository, several different versions of the content encrypted in different ways may be stored therein. In step 726, the encrypted content is stored in the content repository.

In step 728, a guide or title list is generated. The guide or title list may also be referred to as an inventory list. The inventory or title list is generated in response to the content available in the content repository. Preferably, elements of the list are only provided for content available for the different types of targets or devices. That is, when the content list is received by the various devices, only the content that is available to that device is preferably received. The elements of the list may be compiled by the content management system 221. In step 730, the guide, title list or inventory is communicated to the user devices. The title list may be provided to the user devices in various ways including through a satellite, through a terrestrial system, through a terrestrial wireless system, through a web-based system, or the like. The content list may be provided in a different way or using a different communication means than the content is provided. For example, a list may be provided through the satellite, whereas the content may be received through a broadband or Internet-based system. Communication to the user devices may also take place on a web-based system. The user devices may be used to obtain information on a website that is in communication with the user device.

In step 732, a selection is formed at the user device. The selection may be performed by entering or selecting the content from a user interface at the user device. A graphical user interface may have a selection box thereon for selecting. The selection box may be moved using cursors or other devices. Specialized selection buttons or buttons that exist on a system may be used for forming a selection. A signal identifying the selection is formed and communicated to the content processing system. In step 734, once a selection is selection, billing information is updated so the proper user device account may be updated. In step 736, the content delivery network is selected. The content delivery network may be selected depending on the type of content selected. That is, various content delivery networks may be provided in a particular system. However, only one of the content delivery networks may be used for delivering content to that particular user device based upon the formatting and the like.

In step 740, the content is played back or stored in the user device. It should be noted that the playback may be performed while recording the content.

Figure 8:
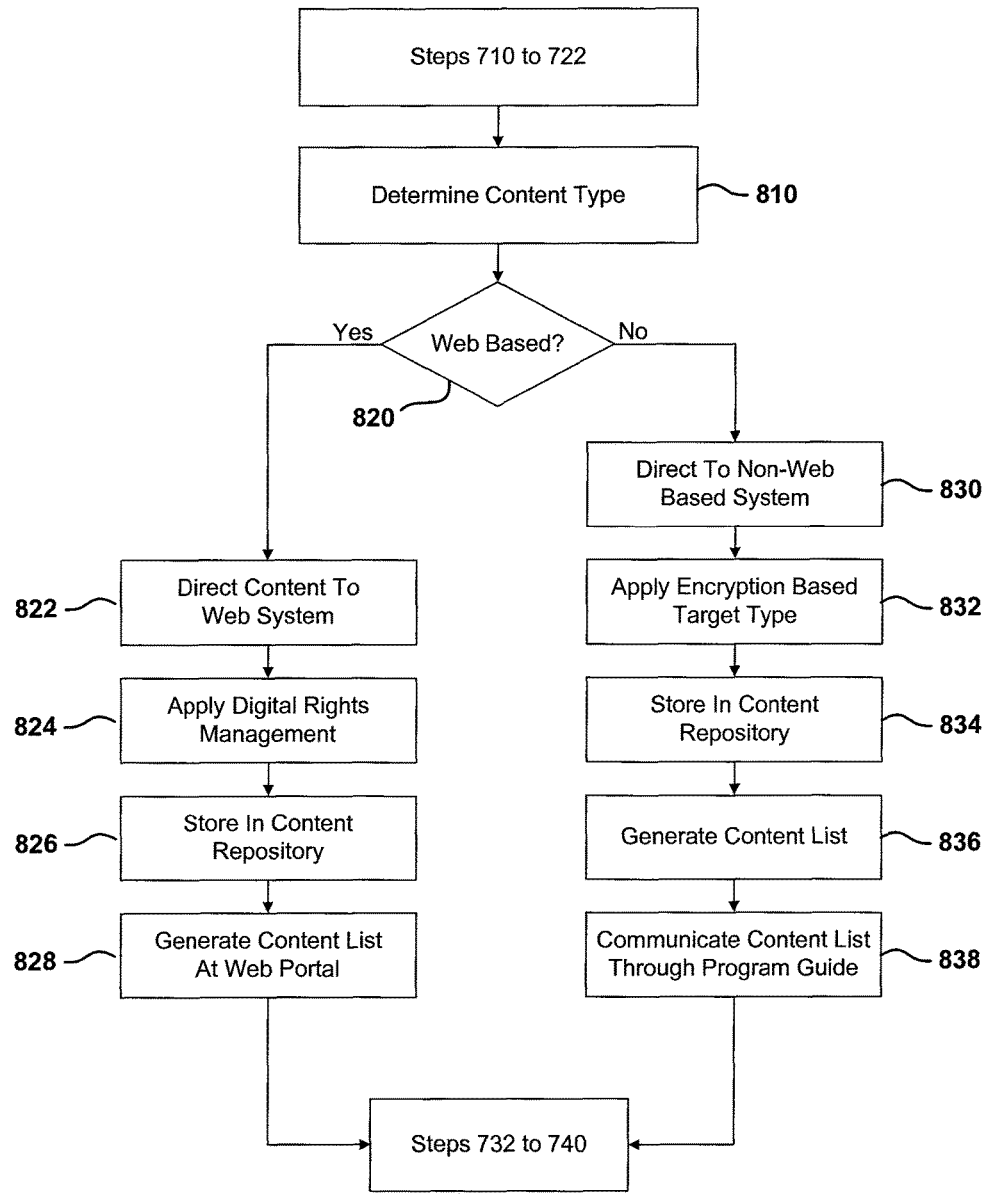
FIG. 8 is a flowchart illustrating a second method for operating the present disclosure.

Referring now to FIG. 8, a specific method for operating the content management system is illustrated. Steps 710-722 of FIG. 7 are shared in this embodiment. In step 810, the content type is determined. The content type is based upon the target described above. The target corresponds to the various types of user devices. In this example, a web-based and non-web-based-type system is employed. However, the same decision blocks may be used for various other types of target devices. It should also be noted that more than two different types of targets may be provided. However, in such a system, the same types of logic may be used. In step 820, the system determines whether or not the content is destined for a web-based system. In step 822, if content is for a web-based system, the block diagram of FIG. 2b may be utilized. In step 824, digital rights management (DRM) may be applied. Digital rights management may be windows media-based digital rights management or various other types of digital rights management. The digital rights management may also include various types of encryption. In step 826, the content with the applied digital rights management and/or encryption is stored in the content repository. In step 828, a list is provided for the content available at a web portal. After step 828, steps 832-740 of FIG. 7 may be performed.

Referring back to step 820, if the system is not a web-based system, step 830 may be performed. In step 830, the schematic of FIG. 2a may be used to process the content. In step 832, encryption is applied to the content based on the target type.

In step 834, the content, with the applied encryption, is stored in the content repository. In step 836, a content list is generated for the particular target. In step 838, the content list may be communicated through the program guide or other means. For a satellite-based system, the program guide may be communicated through the satellite. The content list available from the content delivery network may be periodically updated and communicated through the satellite.

After step 838, steps 732-740 of FIG. 7 may be performed.

When the content is provided to the various content delivery networks, various life cycles, purge times, and the like may be associated with the content. The content may have different life cycles, purge times, and other characteristics when provided to each content delivery network. It should also be noted that the same content may be provided through different content delivery networks with different timing characteristics. The different content delivery network may have the same or different types of encryption as well. The various purge times and other life-cycle components are provided in the metadata as described above.

The example in FIG. 8 is provided for web and non-web-based system. The examples may easily be extended to other types and numbers of systems and targets.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A communication system for providing content from a content processing system on a server side of the communication system to a device side of the communication system, the communication system comprising:
    on the server side of the communication system,
        a content repository storing first content in a first format associated with a first type of device and second content in a second format associated with a second type of device,
        a content management system generating a first content list corresponding to the first content and a second content list, different from the first content list, corresponding to the second content, wherein the content management system generates the first content list and the second content list on the server side of the communication system prior to the first content list and the second content list being provided from the server side of the communication system to the device side of the communication system,
    a first content delivery network providing the first content list, as generated by the content management system on the server side of the communication system, from the server side of the communication system to a first device on the device side of the communication system, wherein the first device corresponds to the first type of device; and
    a second content delivery network providing the second content list, different from the first content list and as generated by the content management system on the server side of the communication system, from the server side of the communication system to a second device on the device side of the communication system, wherein the second device corresponds to the second type of device,
    wherein the first content list and the second content list include different content based on which content is available to the first type of device and the second type of device, respectively.

2. The communication system of claim 1, wherein the first type of device corresponds to a web based device.

3. The communication system of claim 2, wherein the web based device comprises at least one of a cellular phone and a personal digital assistant.

4. The communication system of claim 1, wherein the first type of device corresponds to a satellite device.

5. The communication system of claim 4, wherein the satellite device comprises at least one of a set top box and a mobile satellite receiver.

6. The communication system of claim 1, wherein the content management system generates, on the server side of the communication system, the first content list and the second content list different from the first content list based on a set of rules received at the content management system.

7. The communication system of claim 6, wherein the set of rules includes rules dependent on which of the first type of device and the second type of device the first content list and the second content list, respectively, will be provided to.

8. The communication system of claim 1, wherein, to provide the first content list, the first content delivery network transmits the first content list, as generated by the content management system, to the first device via one of a terrestrial wireless system and a broadband wireless system.

9. The communication system of claim 1, wherein, to provide the second content list, the second content delivery network transmits the second content list, as generated by the content management system, to the second device via a satellite communication system.

10. A method of operating a communication system for providing content from a content processing system on a server side of the communication system to a device side of the communication system, the method comprising:
on the server side of the communication system,
storing first content in a first format associated with a first type of device and second content in a second format associated with a second type of device,
generating a first content list corresponding to the first content and a second content list, different from the first content list, corresponding to the second content, wherein the first content list and the second content list different from the first content list are generated on the server side of the communication system prior to the first content list and the second content list being provided from the server side of the communication system to the device side of the communication system;
using a first content delivery network,
providing the first content list, as generated on the server side of the communication system, from the server side of the communication system to a first device on the device side of the communication system, wherein the first device corresponds to the first type of device; and
using a second content delivery network,
providing the second content list, different from the first content list and as generated on the server side of the communication system, from the server side of the communication system to a second device on the device side of the communication system, wherein the second device corresponds to the second type of device,
wherein the first content list and the second content list include different content based on which content is available to the first type of device and the second type of device, respectively.

11. The method of claim 10, wherein the first type of device corresponds to a web based device.

12. The method of claim 11, wherein the web based device comprises at least one of a cellular phone and a personal digital assistant.

13. The method of claim 10, wherein the first type of device corresponds to a satellite device.

14. The method of claim 13, wherein the satellite device comprises at least one of a set top box and a mobile satellite receiver.

15. The method of claim 10, wherein generating the first content list and the second content list on the server side of the communication system includes generating the first content list and the second content list different from the first content list based on a set of rules received at the server side of the communication system.

16. The method of claim 15, wherein the set of rules includes rules dependent on which of the first type of device and the second type of device the first content list and the second content list, respectively, will be provided to.

17. The method of claim 10, wherein providing the first content list includes transmitting the first content list, as generated on the server side of the communication system, to the first device via one of a terrestrial wireless system and a broadband wireless system.

18. The method of claim 10, wherein providing the second content list includes transmitting the first content list, as generated on the server side of the communication system, to the second device via a satellite communication system.

* * * * *